US008758955B2

(12) United States Patent
Li et al.

(10) Patent No.: US 8,758,955 B2
(45) Date of Patent: Jun. 24, 2014

(54) ADDITIVES TO MITIGATE CATALYST LAYER DEGRADATION IN FUEL CELLS

(75) Inventors: Jing Li, Surrey (CA); Keping Wang, Richmond (CA); Yunsong Yang, Surrey (CA); Scott McDermid, Vancouver (CA); Sumit Kundu, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 488 days.

(21) Appl. No.: 13/081,590

(22) Filed: Apr. 7, 2011

(65) Prior Publication Data

US 2012/0258382 A1 Oct. 11, 2012

(51) Int. Cl.
*H01M 8/10* (2006.01)

(52) U.S. Cl.
USPC .......................................................... 429/492

(58) Field of Classification Search
None
See application file for complete search history.

(56) References Cited

U.S. PATENT DOCUMENTS 7,537,857 B2 * 5/2009 Andrews et al. .............. 429/483
2001/0038937 A1 * 11/2001 Suzuki et al. .................. 429/33
2004/0127588 A1 7/2004 Calumdann et al.
2005/0244695 A1 * 11/2005 Kiefer et al. .................... 429/33
2007/0207361 A1 9/2007 Yamashita
2010/0183943 A1 7/2010 Ugawa et al.

FOREIGN PATENT DOCUMENTS

EP 1826846 A1 8/2007

OTHER PUBLICATIONS

Zhai et al., A novel H3PO4/Nafion-PBI composite membrane for enhanced durability of high temperature PEM fuel cells, Journal of Power Sources 169 (2007) 259-264, Available online Mar. 12, 2007.*
International Search Report dated Jul. 11, 2012.

* cited by examiner

*Primary Examiner* — Patrick Ryan
*Assistant Examiner* — Jose Colucci Rios
(74) *Attorney, Agent, or Firm* — Patent Central LLC; Stephan A. Pendorf

(57) ABSTRACT

Ligand additives having two or more coordination sites in close proximity can be used in the polymer electrolyte of membrane electrode assemblies in solid polymer electrolyte fuel cells in order to reduce the dissolution of catalyst, particularly from the cathode, and hence reduce fuel cell degradation over time.

14 Claims, 1 Drawing Sheet

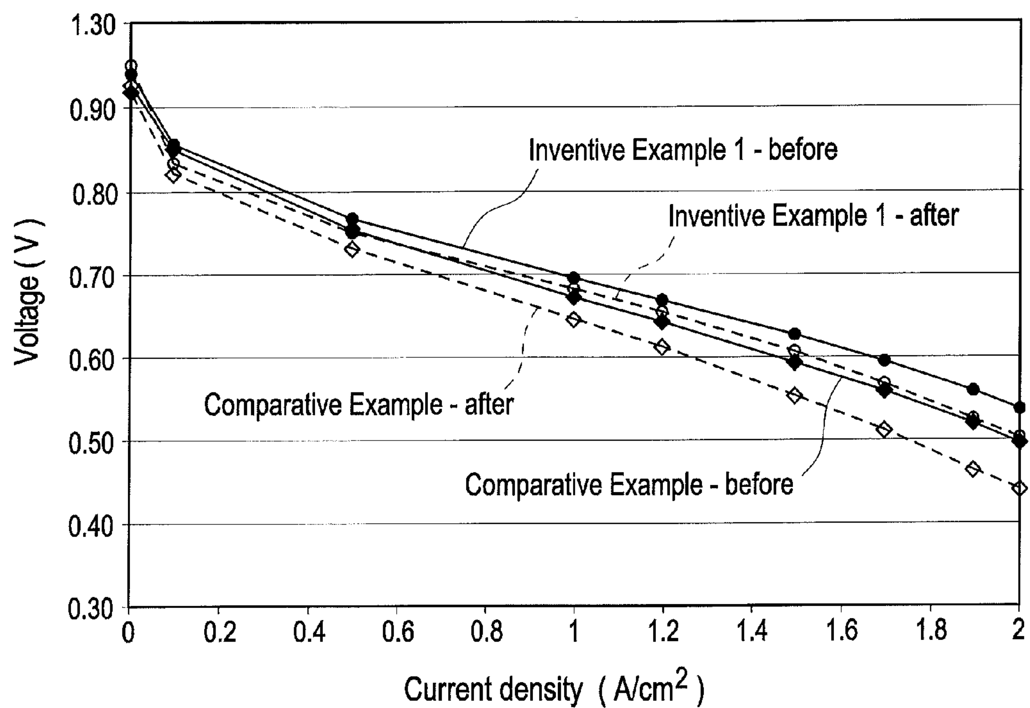
Fig. 1
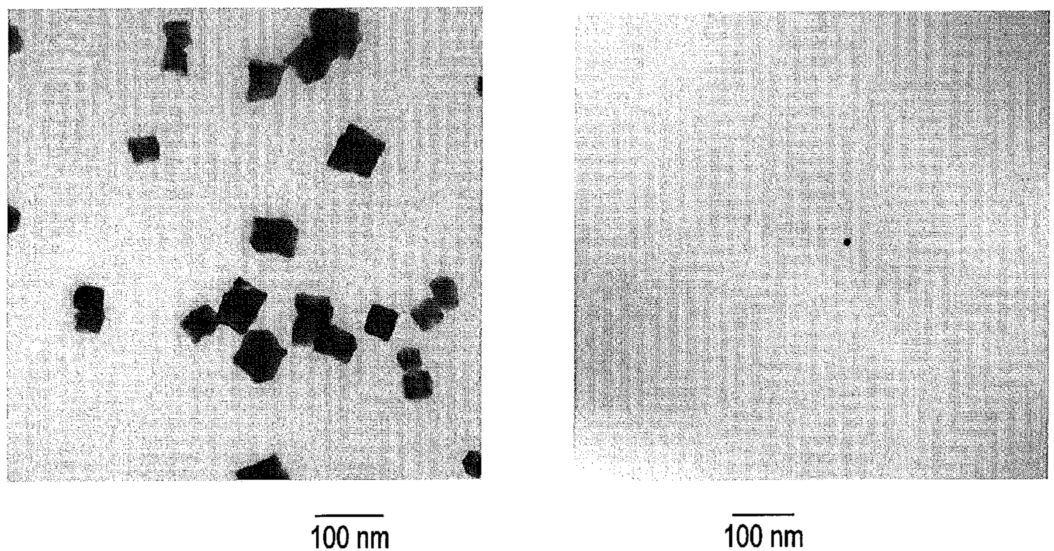
Fig. 2 a
Fig. 2 b

ADDITIVES TO MITIGATE CATALYST LAYER DEGRADATION IN FUEL CELLS

BACKGROUND

1. Field of the Invention

This invention relates to additives for the proton conducting polymer electrolyte used in catalyst layers in fuel cells. In particular, it relates to additives for reducing catalyst dissolution, especially from the cathode.

2. Description of the Related Art

Proton exchange membrane fuel cells (PEMFCs) convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). MEA durability is one of the most important issues for the development of fuel cell systems in either stationary or transportation applications. For automotive applications, an MEA is required to demonstrate durability of about 6,000 hours.

Degradation of the catalyst during operation of the fuel cell, especially during start up or shut down in which the transient potential at the cathode could be over 1 V, is a critical issue to address in order to maintain cell performance without significant decay for over 5,000-6,000 hours of operation. Cathode catalyst layer degradation and the associated decay in fuel cell performance may be caused by 1) loss of Pt catalyst surface area due to formation of larger particles from smaller particle Pt dissolution (Ostwald Ripening) or coalescence of Pt nanoparticles by thermal motion (sintering) or loss of the carbon support typically employed due to carbon corrosion; 2) Pt dissolution and migration into the catalyst electrolyte, membranes, or washed out altogether in by-product water; 3) contamination of ionomer electrolyte by dissolved metal ions from catalyst; and 4) contamination of the catalyst surface by chemicals resulting from ionomer degradation.

One of ways to mitigation the cathode catalyst degradation is to decrease the dissolution of Pt catalyst during fuel cell operation. $Pt^{z+}$ ions most probably do not exist as free species in the ionomer phase or in solution. They have to be associated with counter ions in order to maintain charge neutrality. Fluorine ($F^-$), chlorine ($Cl^-$) and other halogen ions are common counter ions that can form complexes with $Pt^{z+}$ ions to make them water soluble. Halide anions are strong ligands and they may promote ligand exchange with $O^{2-}$ and depassivate a Pt oxide layer, thereby accelerating the dissolution of the Pt. Halide anions can come from residual Pt chloride that is commonly used in the production of Pt nanoparticles. $F^-$ can be released from the perfluorosulfonic acid (PFSA) polymer membrane or ionomer due to the ionomer degradation in the catalyst layer during fuel cell operation. A decrease of halide anions in the catalyst layer could lower the Pt dissolution, thereby mitigating cathode catalyst layer degradation. P. Trogadas and V. Ramani added a peroxide decomposition catalyst ($MnO_2$) into the anode and cathode electrocatalysts to facilitate both electrochemical oxygen reduction and hydrogen peroxide decomposition to water and oxygen [P. Trogadas, V. Ramani, Journal of Power Sources 174 (2007) 159-163]. By lowering hydrogen peroxide concentration within the electrode, the fluorine release rate associated with the decomposition was decreased. However, the drawback was a loss of catalyst activity by adding the $MnO_2$ in the catalyst layer.

In published patent application WO 2008/032802 A1, it was claimed that a complex of Pt having ligands such as acetylacetone and ethylene di-amine tetra-acetic acid (EDTA) as coordinating atoms could mitigate Pt dissolution from catalyst surface due to equilibrium shifting toward solid Pt. In the disclosed voltage cycling test (from 0.05-1.2 V in nitrogen and hydrogen), 10% of acetylacetone in the cathode catalyst layer showed the lowest voltage decay. However, such highly water soluble ligands (acetylacetone solubility: 160 g in one liter of water) are not expected to stay in the catalyst layer long during operation. They will be washed out soon after the load is applied to the fuel cell. Fluorine ions and fluoride fragments, for example, pentafluoropropionic acid (PFPA, $CF_3CF_2COOH$), may form during fuel cell operation as a result of membrane degradation. Fluorine ions formed in the membrane may diffuse into the catalyst layer and accelerate Pt dissolution. Fluoride fragments may contaminate the Pt surface and lower its activity. Therefore, decreasing the fluorine release rate associated with degradation of the membrane by increasing its chemical stability could mitigate catalyst layer degradation.

Different additives to the membrane electrolyte have been studied for purposes of decreasing the fluorine release rate. These additives include: 1) metal elements or compositions containing metal elements or metal alloys that act as a free radical scavenger or a hydrogen peroxide decomposition catalyst (e.g. US2004043283); 2) phenol or phenol derivatives that can be a small molecule or a polymer (e.g. US2006046120); 3) organic crown compounds (e.g. US20060222921) or macrocyclic compounds containing metal or metalloids (e.g. WO2007144633); and 4) cation chelating agents to reduce formation of free radicals (e.g. U.S. Pat. No. 6,607,856).

Additives are also disclosed in WO2005060039 to address the problem in PEM fuel cell durability of premature failure of the ion-exchange membrane. The degradation of the ion-exchange membrane by reactive hydrogen peroxide species can be reduced or eliminated by the presence of an additive in the anode, cathode or ion-exchange membrane. The additive may be a radical scavenger, a membrane cross-linker, a hydrogen peroxide decomposition catalyst and/or a hydrogen peroxide stabilizer. The presence of the additive in the membrane electrode assembly (MEA) may however result in reduced performance of the PEM fuel cell. In particular, suggested additives include an organometallic Mn (II) or Mn (III) complex having an organic ligand selected from CyDTA, ENTMP, gluconate, N,N'-bis(salicylidene)propylenediamine, porphoryns, phthalocyanines, phenanthroline, hydrazine, pyrocatechol-3,5-disulphonic acid disodium salt, triethylenetetraamine, shiff base macrocycles and EDDA.

In commonly owned U.S. patent application Ser. No. 12/615,671, with the title "Composite Proton Conducting Membrane with Low Degradation and Membrane Electrode Assembly for Fuel Cells" and filed on Nov. 10, 2009, certain ligand additives (e.g. 1,10-phenanthroline or 2,2'-bipyridine) were disclosed that meet many of these needs. The use of these ligand additives in the membrane and/or catalyst layers can improve durability but, depending on testing conditions, there may be a modest penalty in fuel cell performance (e.g. 3 times better stability might be obtained but with a 20 mV loss in voltage under load). Preferably, both durability and performance of fuel cells would be improved with appropriate additives.

In PCT patent application PCT/EP2010/006836, also commonly owned by the present applicant, certain additives were disclosed for polymer electrolytes in order to improve both durability and performance. The additives were chemical complexes comprising certain metal and organic ligand components.

There remains a continuing need for improved additives to reduce MEA degradation and, in particular, to prevent dissolution of electrode catalysts during operation. This invention fulfills these needs and provides further related advantages.

SUMMARY

It has been discovered that incorporating certain strongly coordinating ligand additives in the proton conducting ionomer electrolyte of a solid polymer electrolyte fuel cell can be beneficial for fuel cell performance, and particularly to reduce catalyst dissolution and the various problems associated with this. The ligand additives in this composite polymer electrolyte are characterized by an aromatic or heterocyclic structure having two or more coordination sites in close proximity and thus comprise a molecule or polymer thereof wherein the chemical structure of the molecule is selected from the group consisting of:

-continued

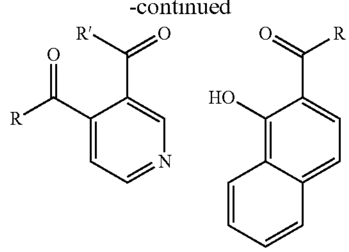

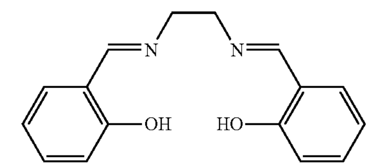

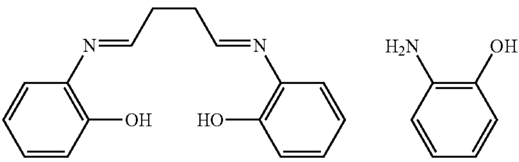

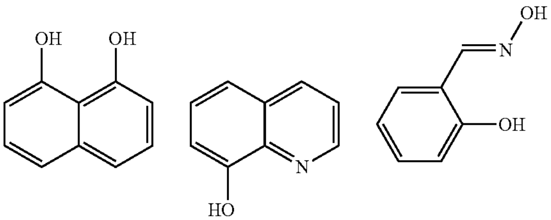

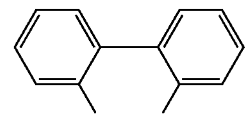

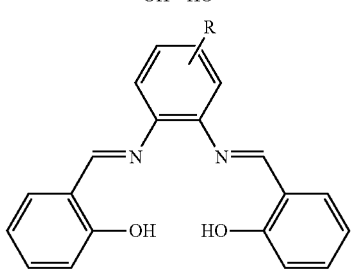

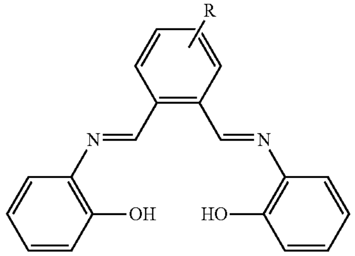

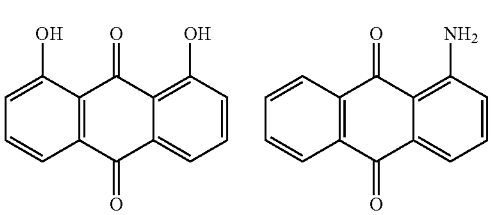

-continued

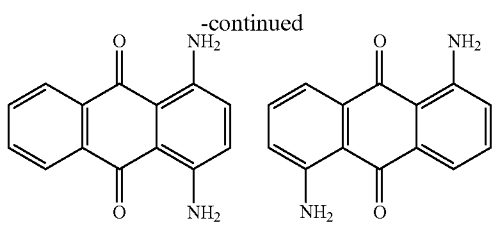

in which R and R' are selected from the group consisting of H, OH, $NH_2$, $CH_3(CH_2)_n$, and an aromatic group, and in which n is an integer from 0 to 10. R and R' may be different or the same moiety. In particular, the ligand can be 5,8-dihydroxy-1,4-naphthoquinone, 2,3-pyridinedicarboxylic acid, 3,4-pyridinedicarboxylic acid, or 2,6-pyridine dicarboxylic acid.

In particular, the amount of additive incorporated can be greater than or about 2% by weight with respect to that of the proton conducting ionomer. As demonstrated in the Examples to follow, amounts up to 5% by weight can be incorporated and be effective. The proton conducting ionomer in the composite can be perfluorosulfonic acid ionomer or hydrocarbon ionomer.

The composite polymer electrolyte of the invention may be used anywhere that electrolyte is normally employed in a fuel cell. However, it is particularly useful in preventing dissolution of a cathode catalyst in a solid polymer electrolyte fuel cell. In this regard, the composite polymer electrolyte is desirably employed in the cathode catalyst layer of the fuel cell.

It can be further advantageous to combine the benefits obtained when using additives of the instant invention with the benefits obtained when using additives from the aforementioned PCT patent application PCT/EP2010/006836. For instance, the former additives may for employed in the cathode catalyst of a fuel cell in combination with employing the latter additives in the membrane electrolyte.

One method for preparing such a composite polymer electrolyte is to prepare an amount of ligand in a solution or dispersion and then to mix it with another solution or dispersion comprising the desired proton conducting ionomer thereby preparing the composite polymer electrolyte in the resulting solution or dispersion. Alternatively, the ligand may instead be added directly to a solution or dispersion comprising the desired proton conducting ionomer.

The composite polymer electrolyte solution or dispersion can then be mixed with a suitable catalyst, catalyst support, and/or other materials and solvents to make a catalyst ink or alternatively the other catalyst ink materials may be added to the aforementioned solutions/dispersions to make a catalyst ink. Alternatively, the ligand additive, the proton conductive ionomer, and suitable solvents, catalyst and catalyst support can be mixed together directly to make a catalyst ink.

These and other aspects of the invention are evident upon reference to the attached Figures and following detailed description.

BRIEF DESCRIPTION OF THE DRAWINGS

FIG. 1 compares the voltage versus current density (polarization) curves of the Inventive Example 1 and the Comparative Example cells, both before and after cycle testing.

FIGS. 2*a* and 2*b* show TEM images of representative membrane electrolyte cross-sections taken after cycle testing from the Comparative Example and the Inventive Example 1 cells respectively.

DETAILED DESCRIPTION

In the present invention, certain oxygen containing ligand additives are used in the polymer electrolyte of membrane electrode assemblies in solid polymer electrolyte fuel cells. The ligand additives exhibit low solubility in water and thus essentially do not wash out from the fuel cell with time and their presence can reduce the dissolution of electrode catalyst, particularly of the cathode catalyst, and thus can reduce fuel cell degradation over time. Several such ligand additives have been demonstrated effective in the Examples to follow.

The ligand additives coordinate strongly with other species and are characterized by an aromatic or heterocyclic structure having two or more coordination sites in close proximity. They comprise a molecule or a polymer of a molecule selected from the group consisting of:

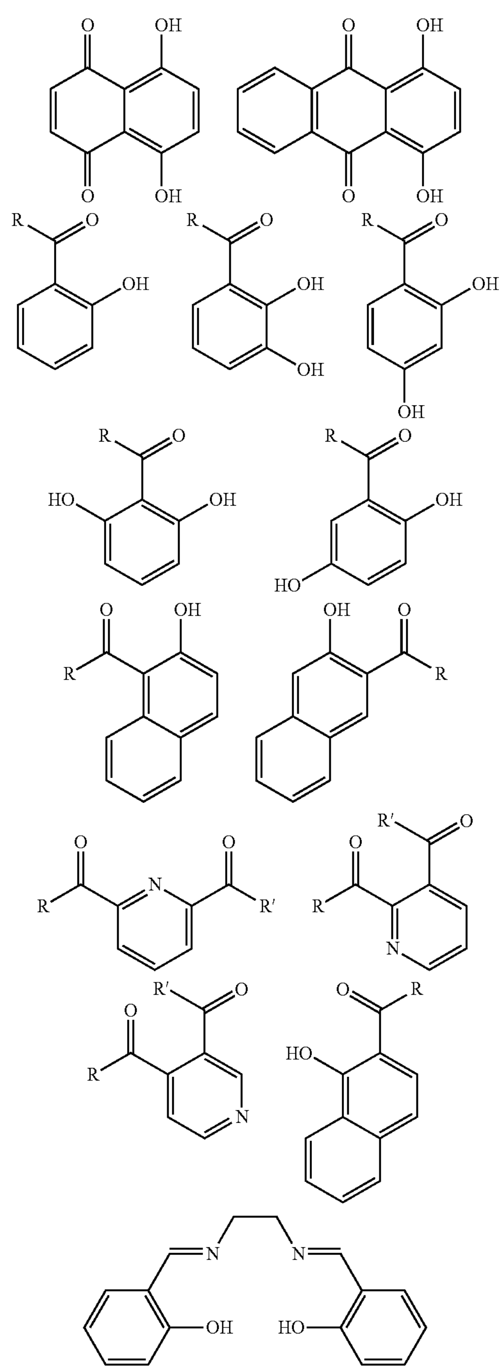

-continued

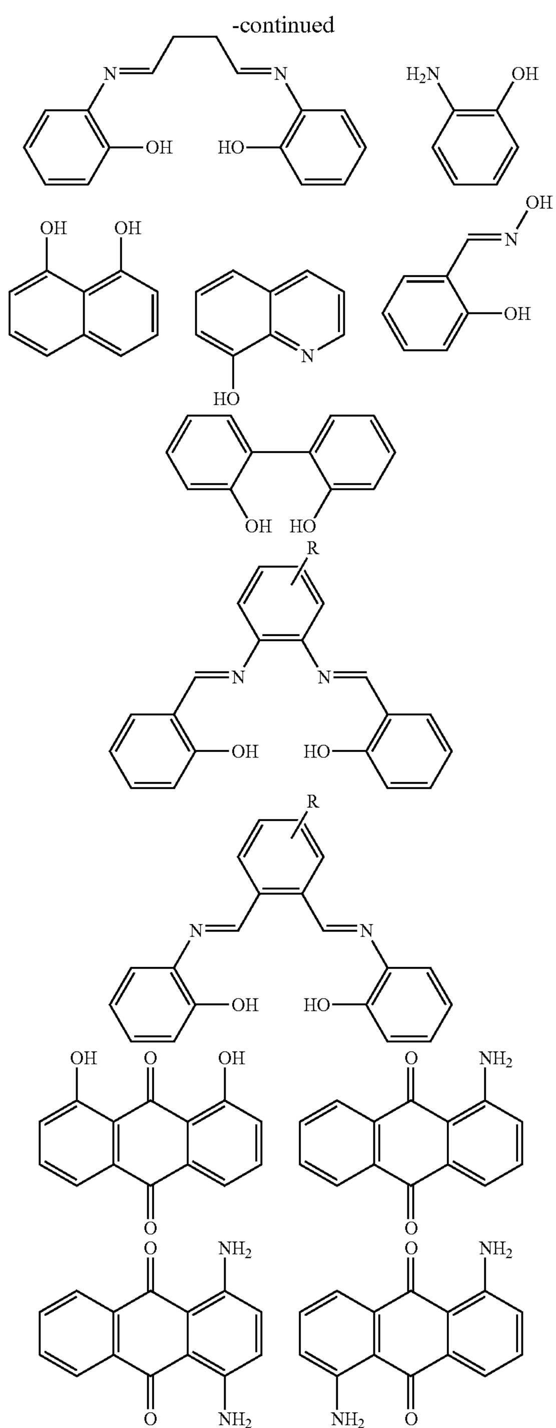

in which R and R' are selected from the group consisting of H, OH, $NH_2$, $CH_3(CH_2)_n$, and an aromatic group, and in which n is an integer from 0 to 10. In the preceding, R and R' may be different or the same moiety. In particular, the ligand can be 5,8-dihydroxy-1,4-naphthoquinone, 2,3-pyridinedicarboxylic acid, 3,4-pyridinedicarboxylic acid, or 2,6-pyridine dicarboxylic acid.

With regard to employing polymer ligand additives, the complex forming units can be either on the polymer backbone or on side chains. The additives can be homopolymers of complex forming units or copolymers of complex forming units. Copolymers can be random or block copolymers. When a complex forming unit is on the polymer side chain, it can be directly attached to the polymer backbone or attached via a spacer. The polymer backbone can be an aromatic, semi- or perfluoro aliphatic polymer. On each side chain, there can be one complex forming unit or multiple complex forming units.

In addition, the presently disclosed ligand additives are selected based on an anticipated ability to chelate with ions arising from dissolution of the catalyst. As discussed later, after forming complexes in the catalyst layer, such ions may no longer exchange with protons in acid groups in the ionomer electrolyte.

The above-mentioned additives are employed in the cathode catalyst layer in order to improve the lifetime of fuel cells.

Such composite polymer electrolytes can be prepared simply by first preparing an amount of the ligand additive in solution or dispersion, then mixing the ligand solution or dispersion with another solution or dispersion comprising the desired proton conducting ionomer. Alternatively, the ligand may be added directly to a solution or dispersion comprising the desired proton conducting ionomer. The ionomer employed can be conventional perfluorosulfonic acid ionomer or hydrocarbon ionomer and the solution or dispersion can include suitable amounts of other additives and solvents. More typically however, the composite dispersion/solution can be used directly to prepare appropriate fuel cell components. For instance, the dispersion/solution may be used directly to cast membrane electrolyte, to prepare catalyst layers, or otherwise be incorporated into membrane electrode assemblies in any conventional manner as desired. For example, in one preferred embodiment, the dispersion/solution can be spray coated onto the surface of a gas diffusion electrode (GDE). The coated GDE can then be bonded with a proton conducting membrane to make a membrane electrode assembly. In another preferred embodiment, a catalyst or conventional catalyst ink can be mixed with the composite dispersion/solution to make a catalyst ink, and then the ink can be coated onto a membrane to make a catalyst coated membrane or onto a gas diffusion layer to make GDE.

Any effective amount of additive may be considered in the composite electrolyte. Amounts like those in the Examples, e.g. in the range from about 2% to 5% by weight to that of the ionomer in the catalyst ink may be used. Preferably, a minimal amount of additive is used to obtain the desired results. Thus, as illustrated in the Examples following, amounts of 5% and under by weight can be effective when used in a catalyst layer.

Without being bound by theory, it is believed that the presently disclosed ligand additives mitigate the voltage decay of a fuel cell that results from catalyst dissolution and contamination associated with degradation of the ionomer electrolyte. These ligand additives can provide several useful functions. They are capable of chelating with metal ions, especially the Fenton ions like iron, nickel, cobalt, copper, etc. and inactivating them as a result and thereby preventing ionomer decomposition with associated release of fluoride decomposition product. Importantly however, the additives can particularly form complexes with Pt and other transition metals in the catalysts typically used in such fuel cells. By complexing with any ions present as a result of catalyst dissolution, the ligand additives can prevent the ions from linking to acid groups in the ionomer electrolyte, thereby contaminating the ionomer. Such dissolved ions could otherwise contaminate the ionomer in the catalyst layer and/or membrane electrolyte through ion exchange with protons therein and thereby lower the ionic conductivity of the ionomer. In turn, this would increase ohmic and mass transfer losses of the MEA, especially under high current density and dry operation conditions.

The following examples are illustrative of the invention but should not be construed as limiting in any way.

EXAMPLES

Polymer electrolyte samples comprising ligand additives of the invention and membrane electrode assemblies (MEAs) using these samples in the cathode catalyst layers were prepared as described below. In addition, MEAs were prepared either with other additives in the catalyst layer or with no additives for illustrative and comparative purposes. Test fuel cells were made with each MEA and were operated with the results being summarized below.

Inventive Example 1

A membrane electrolyte was prepared from a dispersion comprising a mixture of 1,10-phenanthroline-5-amino additive, $MnO_2$, and a commercially available PFSA ionomer dispersion having a solids concentration of 22%. (This composition was selected to obtain improved performance in accordance with the teachings of the aforementioned PCT application PCT/EP2010/006836. The amount of 1,10-phenanthroline-5-amino additive was 0.5 weight % to that of the PFSA. The molar ratio of 1,10-phenanthroline-5-amino additive to Mn was 4:1). The mixture was stirred overnight at 50° C. and a membrane electrolyte sample was cast from solution thereafter.

Then, a mixture comprising commercially obtained naphthazarin (5,8-dihydroxy-1,4-naphthoquinone) and Nafion® ionomer (EW 950) dispersion was prepared in which the amount of naphthazarin to ionomer was 2% by weight. The mixture was stirred for about 2 to 4 hours at room temperature. Commercially obtained carbon supported catalyst was then mixed into the dispersion in a solid weight ratio of 33/67 (ionomer/supported catalyst). The resulting ink was then coated onto a PTFE release sheet and the dried coating was then transferred to the aforementioned membrane electrolyte sample to make a "half-CCM" or half-catalyst coated membrane in which the catalyst layer was the cathode catalyst. The Pt loading here was 0.27 mg/cm$^2$.

A conventional anode with a Pt loading of 0.3 mg/cm$^2$ was then bonded to this half-CCM at 150-160° C. under pressure for 2.5 minutes, thereby completing the sample MEA.

Inventive Example 2

A MEA similar to that of Inventive Example 1 was prepared except that instead of naphthazarin, 2,6-pyridine dicarboxylic acid was used as the oxygen containing ligand additive in the cathode catalyst layer instead. The amount of 2,6-pyridine dicarboxylic acid to ionomer was 5% by weight.

Illustrative Example

A MEA similar to that of Inventive Example 1 was prepared except that instead of naphthazarin, 1,10-phenanthroline-5-amino additive was used in the cathode catalyst layer instead (this additive being a ligand which is the same as that appearing in the membrane electrolyte). The amount of 1,10-phenanthroline-5-amino additive to ionomer was 1% by weight.

Comparative Example

For comparative purposes, a MEA similar to that of Inventive Example 1 was prepared except that there was no naphthazarin or other additive in the cathode catalyst layer nor in the membrane.

Fuel cells with 48 cm$^2$ active area were then assembled using each of the above MEA samples. 5 different samples were tested at the same time using a 5 cells stack. The stack was subjected to an accelerated stress test which focused primarily on cathode catalyst layer degradation. This involved subjecting each cell in the 5 cell stack to voltage cycling between 0.6 and 1 volts using a square wave cycle of 2 sec and 10 sec duration respectively. Air and hydrogen were used as reactant gases at gas stoichiometries of 12 and 9 respectively, with both supplied to the stack at 100% relative humidity. The operating temperature of the stack was 80° C. Cell performance was evaluated by obtaining polarization curves (voltage versus current density) prior to cycling and then again after 20,000 cycles. Thereafter, the stack and cells were disassembled. Representative cross-sections were obtained from various locations within the cells and these were observed under a scanning electron microscope (SEM). Certain samples were also observed under a transmission electron microscope (TEM).

FIG. 1 shows the voltage versus current density (polarization) curves obtained for the cells comprising the Inventive Example 1 and the Comparative Example MEAs, both before and after cycle testing. The initial polarization curves for both cells were about the same (with the Inventive Example 1 cell showing slightly better performance). After cycle testing however, the Comparative Example cell showed a voltage drop of approximately 50 mV from its initial value at 1.7 A/cm$^2$. The Inventive Example 1 cell on the other hand showed only a 10 mV voltage drop at this current density. After disassembly and cross-section, a significant dense band of Pt was clearly seen in the membrane electrolyte from the Comparative Example cell in the SEM images. No visible Pt was evident in the electrolyte of Inventive Example 1 cell. FIGS. **2*a* and 2*b* show TEM images for representative membrane cross-sections cross-sections from the Comparative Example cell and the Inventive Example 1 cell respectively. The scale in each Figure is the same and is indicated by the 100 nm bar at the bottom of each Figure. A substantial amount of Pt was evident in FIG. 2*a* (the dark squares) while only a tiny amount of Pt was apparent in FIG. 2*b*** (the small dark dot).

In a like manner, the initial polarization curve for the Inventive Example 2 cell was about the same as that of the Comparative Example cell. After cycle testing, the Inventive Example 2 cell showed a 20 mV voltage drop from its initial value at 1.7 A/cm$^2$, which was substantially better than the 50 mV drop seen in the Comparative Example cell. Under the SEM, no Pt band was observed in the vicinity of the reactant inlets or in the middle of the cell. However, a Pt band was evident near the reactant outlets.

The initial polarization curve for the Illustrative Example cell was again slightly better than that of the Comparative Example cell. After cycle testing, the Illustrative Example cell showed a 20 mV voltage drop from its initial value at 1.7 A/cm$^2$, which was substantially better than the 50 mV drop seen in the Comparative Example cell. Under the SEM, no Pt band was evident anywhere in the membrane from the Illustrative Example cell.

Thus, all the above Inventive and Illustrative cells show improved results with regards to cycle life testing and dissolution of the cathode catalyst. The results can be comparable or better than those obtained when employing additives like those in the aforementioned PCT application PCT/EP2010/006836.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A proton conducting composite polymer electrolyte for a membrane electrode assembly in a solid polymer electrolyte fuel cell comprising:

a proton conducting ionomer and an amount of a strongly coordinating ligand additive having an aromatic or heterocyclic structure having two or more coordination sites in close proximity, wherein the ligand comprises a molecule or polymer thereof wherein the chemical structure of the molecule is selected from the group consisting of:

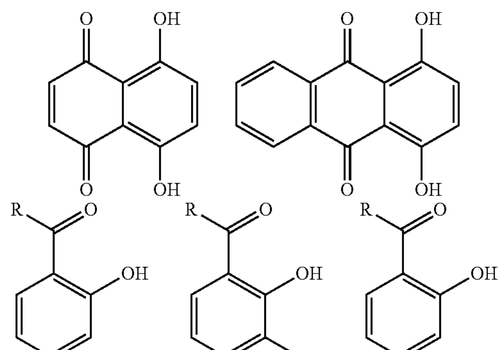

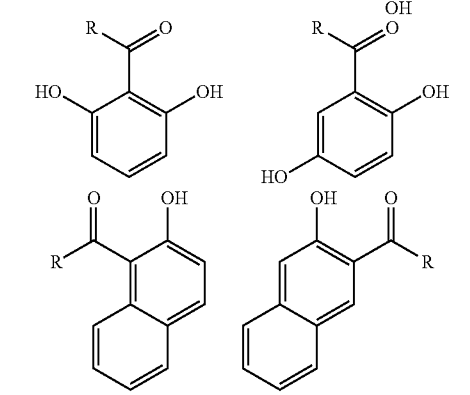

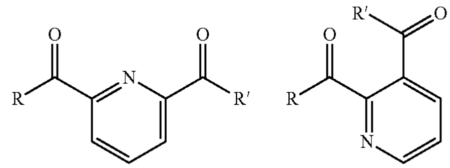

-continued

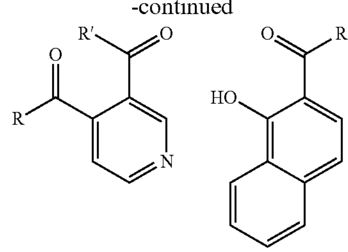

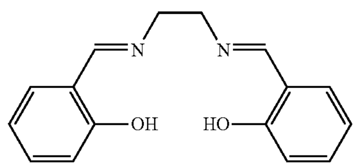

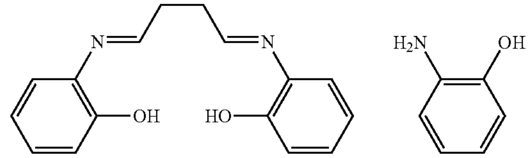

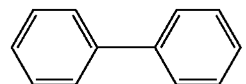

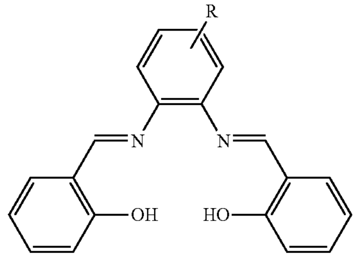

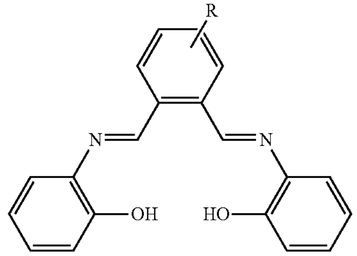

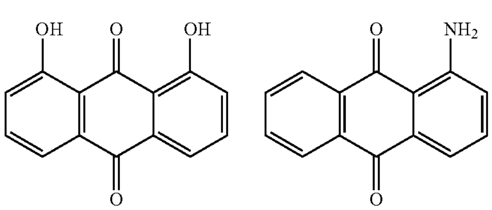

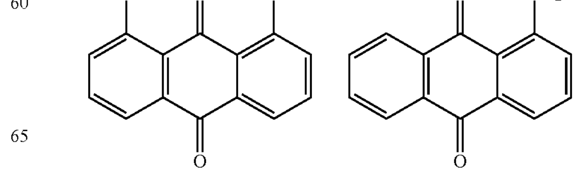

-continued

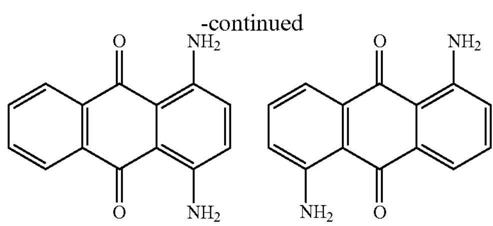

wherein R and R' are selected from the group consisting of H, OH, $NH_2$, $CH_3(CH_2)_n$, and an aromatic group, and wherein n is an integer from 0 to 10.

2. The composite polymer electrolyte of claim 1, wherein R is the same as R'.

3. The composite polymer electrolyte of claim 1, wherein the ligand is 5,8-dihydroxy-1,4-naphthoquinone, 2,3-pyridinedicarboxylic acid, 3,4-pyridinedicarboxylic acid, or 2,6-pyridine dicarboxylic acid.

4. The composite polymer electrolyte of claim 3, wherein the ligand is 5,8-dihydroxy-1,4-naphthoquinone, or 2,6-pyridine dicarboxylic acid.

5. The composite polymer electrolyte of claim 1, wherein the amount of the ligand additive in the composite polymer electrolyte is greater than or about 2% by weight of the proton conducting ionomer.

6. The composite polymer electrolyte of claim 5, wherein the amount of the ligand additive in the composite polymer electrolyte is from about 2% to about 5% by weight of the proton conducting ionomer.

7. The composite polymer electrolyte of claim 1, wherein the ligand is part of a complex comprising a metal and the ligand.

8. The composite polymer electrolyte of claim 1, wherein the proton conducting ionomer is perfluorosulfonic acid ionomer or hydrocarbon ionomer.

9. A membrane electrode assembly for a solid polymer electrolyte fuel cell comprising an anode catalyst layer, a membrane electrolyte, a cathode catalyst layer and the composite polymer electrolyte of claim 1.

10. The membrane electrode assembly of claim 9, wherein the cathode catalyst layer comprises the composite polymer electrolyte of claim 1.

11. A solid polymer electrolyte fuel cell comprising the membrane electrode assembly of claim 9.

12. A method of making the composite polymer electrolyte of claim 1, comprising:

preparing an amount of the ligand in a solution or dispersion; and mixing the solution or dispersion comprising the ligand with a solution or dispersion comprising the proton conducting ionomer, thereby preparing the composite polymer electrolyte in the solution or dispersion.

13. A method of making the composite polymer electrolyte of claim 1, comprising:

mixing an amount of the ligand in a solution or dispersion comprising the proton conducting ionomer, thereby preparing the composite polymer electrolyte in the solution or dispersion.

14. A method of preventing dissolution of a cathode catalyst in a solid polymer electrolyte fuel cell comprising a membrane electrode assembly comprising an anode catalyst layer, a membrane electrolyte, and a cathode catalyst layer, the method comprising using the composite polymer electrolyte of claim 1 in the cathode catalyst layer.

* * * * *